April 19, 1938. A. R. THOMPSON 2,114,580
HARVESTING MACHINE
Filed Oct. 2, 1935 3 Sheets-Sheet 2

INVENTOR.
Albert R. Thompson.
BY Philip A. Minnis
ATTORNEY.

April 19, 1938.   A. R. THOMPSON   2,114,580
HARVESTING MACHINE
Filed Oct. 2, 1935   3 Sheets-Sheet 3

INVENTOR.
Albert R. Thompson.
BY Philip A. Minnis
ATTORNEY.

Patented Apr. 19, 1938

2,114,580

UNITED STATES PATENT OFFICE 2,114,580

HARVESTING MACHINE

Albert R. Thompson, Los Gatos, Calif., assignor to Food Machinery Corporation, San Jose, Calif., a corporation of Delaware Application October 2, 1935, Serial No. 43,155

13 Claims. (Cl. 56—1)

This invention relates to harvesting machines, such as may be utilized for harvesting alfalfa hay or the like, and is more particularly concerned with certain new and useful improvements in machines of this character, wherein mechanism is employed in conjunction with a mowing device for treating the mowed plants prior to their discharge from the machine.

Such a machine, for example, is disclosed in U. S. Letters Patent to E. B. Cushman, No. 1,972,680, dated September 4, 1934, wherein a crushing mechanism is employed to crush the mowed plants prior to their discharge back upon the ground, for the purpose of accelerating the curing, and improving the quality of the hay.

In machines of the character referred to, the employment of a mechanically driven conveyor for transferring the mowed plants from the mowing device to the crushing mechanism, has not only been found to involve relatively complicated and expensive construction, but the mechanism is also highly susceptible to misadjustment and break down under the unusual stresses and strains resulting from the uneven terrain over which such machines are commonly required to be driven.

My invention has for one of its objects to provide a harvesting machine wherein the transfer of the mowed plants from a mowing device to a crushing or other treating mechanism may be effectively accomplished without the employment of a mechanically driven conveyor.

It is also a general object of the invention to provide a harvesting machine of the general character referred to, which is of simple and inexpensive construction, and rugged and efficient in operation.

Another object is to provide a crushing mechanism for harvesting machines which is designed to effectively crush the plants without danger of breaking up their stems.

A further object is to provide a cleaning mechanism for the crushing rolls of such a crushing mechanism, which is effective in operation and not susceptible to clogging.

These, and other objects, as well as the various novel features of construction comprehended by the invention, will best be understood by reference to the accompanying drawings wherein Fig. 1 is a plan view of a harvesting machine constructed in accordance with the invention.

Figure 1:
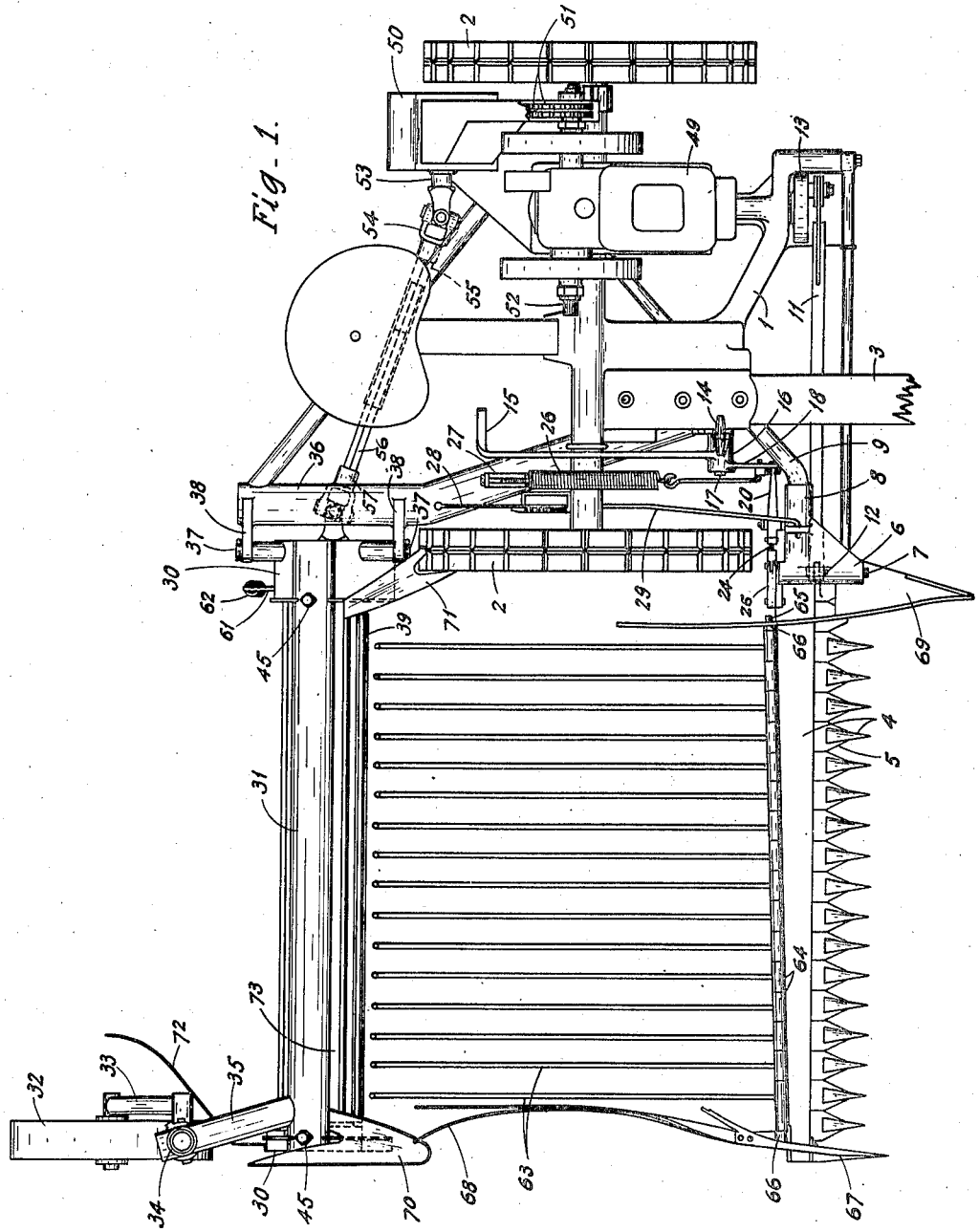

The machine illustrated embodies a conventional mowing machine of the trailer type including a frame work indicated generally at 1, mounted on traction wheels 2, and provided with a draw bar 3, by which it may be attached to a tractor or the like, and thereby be pulled over the field. A mowing device including the usual cutter bar 4 and reciprocatory notched cutting knife 5, projects laterally from the forward part of the frame work 1, and is attached thereto in well known manner as by a bracket 6, to which the cutter bar is pivotally secured at 7, and which is in turn journalled for oscillatory adjustment by means of a socket bearing 8, cast integral with the bracket, and fitted over a spindle formed by the outer free end of an arm 9, pivotally secured to a bracket 10, depending from the frame work 1.

The cutter knife is reciprocated by a connecting rod 11, pivoted to the knife at 12 and driven from the axle of the machine in the usual manner as by a crank disc 13, secured to a shaft, (not shown), having driving engagement with the axle. The entire mowing device may be swung vertically when not in use by means of a lever 14, and foot pedal 15, having a common hub or bearing 16, which is pivoted to the frame work of the machine at 17, and carries a crank arm 18. A link 19 connects the crank arm 18 with a bell crank 20, mounted in a bracket 21, which is pivotally secured to the bracket 6 at 22. The bell crank 20 is in turn connected with the cutter bar 4 by a link 23, tie rod 24, and arcuate link 25. A spring 26, secured between a bracket 27 and the crank arm 18 serves to assist in lifting the mowing device. The mowing device may also be tilted about its ov..1 axis by a hand lever 28, operatively connected with the bracket 6 by a link 29.

All of the foregoing described structure is conventional construction well known to the art, so that further detailed description is believed to be unnecessary.

In addition to the conventional mower construction thus far described, a crushing mechanism is arranged to the rear of the mowing device for receiving and crushing the mowed plants, prior to discharging them back upon the ground. This crushing mechanism is mounted in an auxiliary frame work made up of a pair of end castings 30, rigidly interconnected by a tubular beam 31, and supported at its outer end by a caster wheel 32 having its mounting 33 swivelled in a bearing 34 formed on an arm 35 projecting rearwardly from the tubular beam 31.

The inner end of the auxiliary frame work is pivotally attached to a tubular beam 36 by means of pivot pins 37 carried by the inner end casting 30, and journalled in brackets 38 projecting from the beam 36. By this construction, it will be apparent that the auxiliary frame work and its associated crushing mechanism is free to rise and fall independently of the rest of the machine as it is advanced over uneven ground.

The crushing mechanism includes a pair of compression rolls 39 and 40, at least one of which is preferably formed of, or covered with rubber of medium hardness, such as to insure crushing of the plants passing between the rolls, but having enough resiliency to prevent the breaking apart or chewing up of the plants, such as has been found to occur if both rolls are of a hard material, such as metal. On the other hand, I have found that the effectiveness of the rolls is increased without damage to the plants, if the other roll is formed of, or has a hard surface, such as metal.

In the illustrated embodiment, the upper roll 39 is covered with rubber of the character referred to and is preferably corrugated as shown, to assist the feed of the plants between the rolls. The lower roll 40 is preferably made of metal, or other similarly hard material, and is also preferably smooth surfaced, since I have found that where corrugations are provided on the hard surfaced roll, they have a tendency to chew up and break apart the plants. The corrugations on the rubber covered roll are sufficient to obtain the desired tractive effect on the plants, without breaking the plants to pieces.

The crushing rolls are supported and driven by shafts 41, journalled in bearing blocks 42, which are slidably mounted in guide slots 43 formed in the end castings 30. The lower bearing blocks rest against the lower extremities of the guide slots, and coiled springs 44 bearing against the upper bearing blocks, serve to maintain the rolls in compressive engagement. The degree of compression may be varied to suit requirements by means of adjusting screws 45, carrying retaining plates 46 against which the upper ends of the springs bear. The rolls 39 and 40 are geared together for rotation in opposite directions by means of intermeshing pinions 47, 48, secured to the respective roll shafts; the pinion teeth being deep enough so they will not disengage by limited separation of the rolls, occasioned by the passage of plants therebetween.

Power for driving the rolls in the directions indicated by the arrows, may be supplied from a gasoline engine 49, which drives the gearing (not shown) in a gear box 50, by means of chains 51, trained around driving sprockets carried by the fly wheel shaft 52 of the engine. The power take-off shaft 53 from the gear box 50, is connected by a universal joint 54, with an extensible transmission shaft, made up of a hollow square section 55, into which a second squared shaft section 56 slidably projects. The shaft section 56 is in turn connected through another universal joint 57 with the shaft of the upper compression roll 39. By such construction it will be apparent that the sectional power transmission shaft is free to extend and contract in accordance with the rise and fall of the upper compression roll as the plants pass between the rolls.

To prevent fouling of the compression rolls by accumulation thereon of plant material, which in operation has a tendency to stick to them, and interfere with their effectivness, mechanism is provided for keeping the rolls clean. Such mechanism includes a pair of scraper blades 58 carried by rods 59, which are pivotally journalled at their opposite ends in brackets 60, secured to the end castings 30. The scraper rods 59 are provided with arms 61, between which a compression spring 62 is confined, and operates to hold the blades in operative engagement with the rolls.

It will be observed that the arrangement of the scraper blades with respect to the direction of rotation of the compression rolls is such that they bear against the sides of the rolls travelling away from the scrapers. By this arrangement, the adhering material which is scraped from the compression rolls cannot foul the scraper blades by hanging up on their forward edges, but merely accumulates between the faces of the blades and the roll surfaces, until the pressure of the accumulating material causes the scrapers to yield against the tension of the spring 62, whereupon the material is released and falls to the ground.

For directing the mowed plants from the mowing device to the compression rolls, I employ a rack or apron, made up of a series of spaced bars or tines 63, which extend rearwardly from the mowing device into proximity with the rolls and are open at their rear ends. These tines are preferably mounted so that they are free to trail along the ground behind the mowing device and to this end, each tine is provided with a sleeve bearing 64 at its forward end, by which it is individually journalled on a rod 65 supported in ears 66 formed on the rear of the cutter bar.

Figure 2:
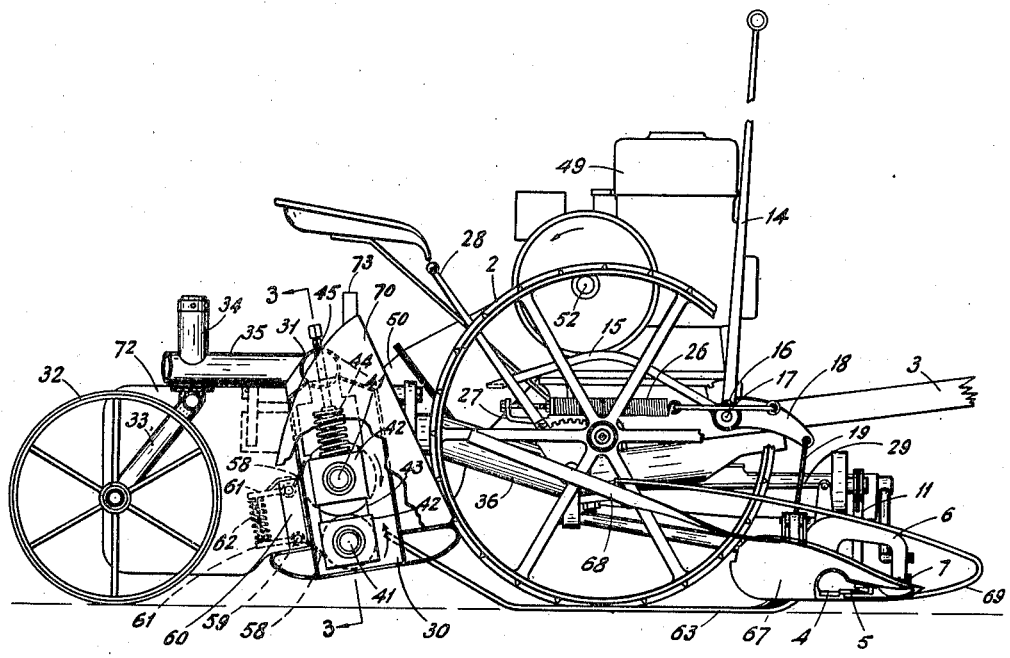
Fig. 2 is a side elevation of the machine, as viewed from the left of Fig. 1.
Figure 3:
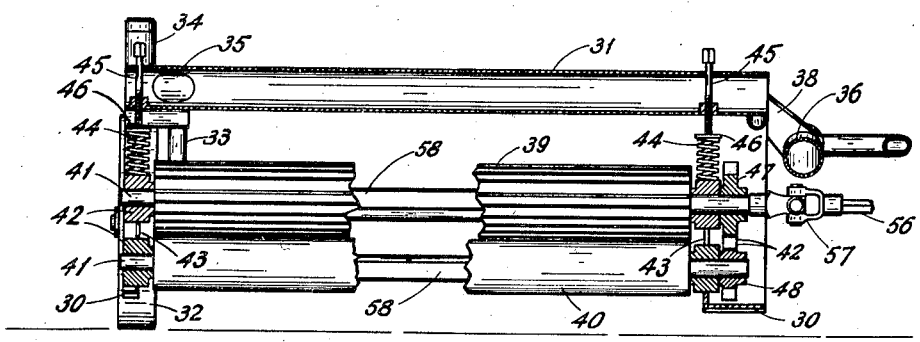
Fig. 3 is a sectional elevation as viewed along the line 3—3 of Fig. 2.
Figure 4:
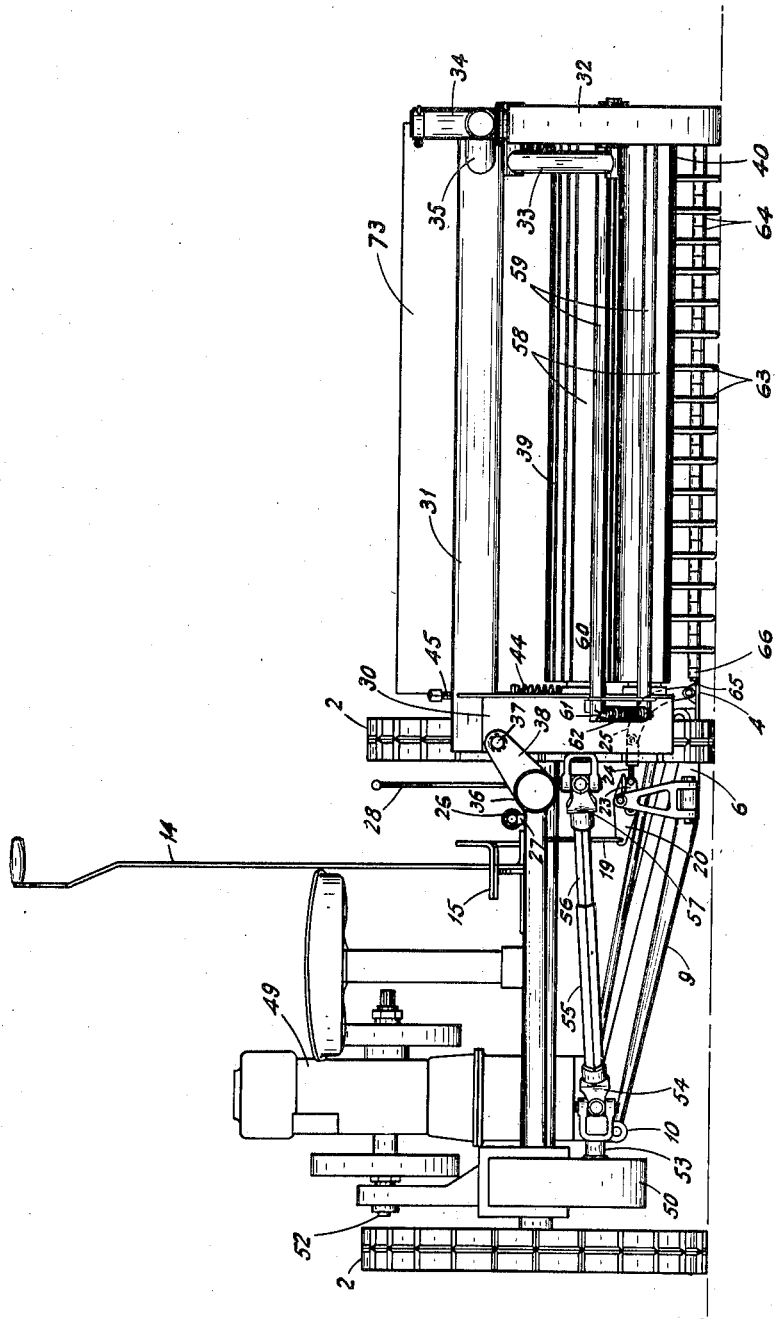
Fig. 4 is a rear elevation of the machine.

As best seen in Fig. 2, the tines 63 are bent downwardly just behind the cutter bar and extend substantially horizontally for the major portion of their length. It will thus be apparent that as the tines trail along the ground, they extend below the plane of the mowing device and thereby permit the stubble of the mowed plants to project upwardly therebetween into engagement with the mowed plants, which fall backwardly from the mowing device. The result is that as the machine is advanced over the field, the mowed plants are restrained against being advanced with the tines, by the stubble projecting through them, and by bending the rear portions of the tines upwardly as illustrated, the plants are directed between the compression rolls. It will thus be apparent that in operation, the mowed plants falling backwardly from the mowing device, are guided over the tines and introduced between the compression rolls, without the use of a mechanically driven conveyor.

It is also to be observed that by reason of the individually pivoted mountings of the tines, they are entirely independent of each other, so that each is free to rise and fall according to the contour of the ground independently of the others. The advantage of this construction is that each tine is free to ride over and be lifted by local surface irregularities without causing any of the other tines, which may be resting on lower ground, to be lifted above the stubble tops.

The machine may be provided with the usual divider 67, to separate the plants being mowed, from the standing plants with which they may be more or less tangled, and guide strips 68 may extend rearwardly from the divider to retain the mowed plants over the tines.

A guide 69 may also be secured to the bracket 6 on the opposite end of the mowing device, to guide the mowed plants on to the tines, and similar guides 70 and 71 may be secured to the end castings of the crushing mechanism to guide the plants between the compression rolls.

The wing 72 extending rearwardly from the outer end casting of the crushing mechanism, serves to direct the hay discharged from the rolls out of the path of the caster wheel and thereby leave a cleared path between the swath and the standing hay, so that on the next cutting the inner traction wheeel will have a cleared path over which it may roll without running over mown hay and becoming fouled therewith. A shield 73 secured to the forward side of the tubular beam 31 assists in directing the mowed hay between the compression rolls, particularly in windy weather.

It is believed that the construction and operation of the apparatus disclosed will now be apparent from the foregoing description, and while for purposes of illustration I have disclosed but a single embodiment of the invention, it will be understood that many changes and modifications may be made therein, without departing from the spirit of the invention, and I regard myself as entitled to all such changes and modifications as fall within the scope of the claims hereto appended.

Having now described my invention and in what manner the same may be used, what I claim as new, and desire to protect by Letters Patent is:

1. In a harvesting machine having a mowing device and means for treating the mowed plants, a plurality of rearwardly extending spaced bars arranged behind said mowing device for directing the mowed plants to said treating means, said bars extending below the cutting plane of the mowing device to permit the plant stubble to project upwardly between them into engagement with the mowed plant thereon.

2. In a harvesting machine, a mowing device, a plurality of rearwardly extending spaced bars arranged behind said mowing device, said bars extending below the cutting plane of the mowing device to permit the plant stubble to project upwardly between them into engagement with the mowed plants thereon, and a pair of compression rolls arranged to receive the mowed plants therebetween from said bars.

3. In a harvesting machine, a mowing device, a plurality of rearwardly extending bars arranged behind said mowing device and extending beneath the discharge therefrom, said bars being spaced to form intervening rearwardly open slots, and extending below the cutting plane of the mowing device to permit the plant stubble to project upwardly between them whereby the mowed plants are received upon the stubble as they fall from the mowing device, and a treating mechanism arranged behind said bars to receive the mowed plants therefrom.

4. In a harvesting machine, a mowing device, a pair of compression rolls, a plurality of spaced bars extending longitudinally between said mowing device and compression rolls, said bars extending below the cutting plane of the mowing device to permit the plant stubble to project upwardly between them into engagement with the mowed plants thereon, and the rear ends of said bars being inclined upwardly to direct the mowed plants between said compression rolls.

5. In a harvesting machine having a mowing device and means for treating the mowed plants, a plurality of rearwardly extending tines arranged behind said mowing device for directing the mowed plants to said treating means, said tines being individually pivoted at their forward ends whereby they are free to trail along the ground and independently adjust themselves to the contour thereof, said tines being spaced apart to permit the plant stubble to project therebetween into engagement with the mowed plants thereon.

6. In a harvesting machine, a mowing device, a plurality of rearwardly extending tines arranged behind said mowing device and individually pivoted at their forward ends whereby they are free to trail along the ground and independently adjust themselves to the contour thereof, said tines being spaced apart to permit the plant stubble to project therebetween into engagement with the mowed plants thereon, and a pair of compression rolls arranged to receive the mowed plants therebetween.

7. In a harvesting machine, a mowing device pivotally secured to the frame work of said machine for vertical swinging movement, a plurality of rearwardly extending spaced bars arranged behind said mowing device and extending below the cutting plane of said mowing device to permit the plant stubble to project upwardly between them into engagement with the mowed plants thereon, a treating mechanism arranged to receive the mowed plants from said bars, and an auxiliary supporting frame for said treating mechanism pivoted to the framework of said machine for vertical swinging movement independently of said mowing device.

8. In a harvesting machine, a mowing device pivotally secured to the framework of said machine for vertical swinging movement, a plurality of rearwardly extending tines arranged behind said mowing device and individually pivoted at their forward ends whereby they are free to trail along the ground and independently adjust themselves to the contour thereof, said tines being spaced apart to permit the plant stubble to project therebetween into engagement with the mowed plants thereon, a treating mechanism to receive the mowed plants from said tines, and an auxiliary supporting frame for said treating mechanism pivoted to the framework of said machine for vertical swinging movement independently of said mowing device.

9. An apparatus for treating plants comprising a pair of compression rolls mounted in adjacent parallel relation to compress plants introduced therebetween, and means for driving said rolls, one of said rolls having a resilient longitudinally corrugated surface, and the other of said rolls having a hard smooth surface.

10. In a harvesting machine having a mowing device, means for treating the mowed plants including a pair of compression rolls mounted in adjacent parallel relation to compress plants introduced therebetween, means for driving said rolls, means for directing the mowed plants from said mowing device to said compression rolls, one of said rolls having a resilient longitudinally corrugated surface, and the other of said rolls having a hard smooth surface.

11. In combination with a treating roll, means for driving said roll, means for cleaning said roll including a scraper pivotally mounted adjacent said roll for scraping engagement with the side of the roll rotating away from the scraper, and yieldable means for holding said scraper in operative engagement with the roll.

12. The combination with a pair of oppositely rotating compression rolls, means for cleaning the same comprising a scraper mounted adjacent each roll for scraping engagement with the side of the roll rotating away from the scraper, and yieldable means for holding said scrapers in operative engagement with the rolls.

13. In a harvesting machine having a mowing device, means including a pair of compression rolls for receiving and compressing the mowed plants therebetween, and means for cleaning said rolls including a scraper mounted adjacent each roll for scraping engagement with the side of the roll rotating away from the scraper, and yieldable means for holding said scrapers in operative engagement with the rolls.

ALBERT R. THOMPSON.